(12) United States Patent
Kibben et al.

(10) Patent No.: US 9,937,957 B2
(45) Date of Patent: Apr. 10, 2018

(54) VEHICLE BODY COMPRISING AN INTERCEPTION DEVICE FOR FRONTAL COLLISIONS WITH A SLIGHT OVERLAP

(71) Applicant: thyssenkrupp Steel Europe AG, Duisburg (DE)

(72) Inventors: Martin Kibben, Dinslaken (DE); Lothar Patberg, Moers (DE); Rolf Peter Röttger, Mülheim/Ruhr (DE); Markus Zörnack, Lake Orion, MI (US)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 15/037,946

(22) PCT Filed: Nov. 19, 2014

(86) PCT No.: PCT/EP2014/003092
§ 371 (c)(1),
(2) Date: May 19, 2016

(87) PCT Pub. No.: WO2015/074753
PCT Pub. Date: May 28, 2015

(65) Prior Publication Data
US 2016/0280271 A1 Sep. 29, 2016

(30) Foreign Application Priority Data

Nov. 22, 2013 (DE) .................. 10 2013 019 522

(51) Int. Cl.
*B62D 21/15* (2006.01)
*B62D 29/00* (2006.01)
(Continued)

(52) U.S. Cl.
CPC ............ *B62D 21/152* (2013.01); *B60R 19/16* (2013.01); *B60R 19/34* (2013.01); *B62D 29/007* (2013.01)

(58) Field of Classification Search
CPC ............................................... B60R 2021/0023
(Continued)

(56) References Cited

U.S. PATENT DOCUMENTS

2012/0025545 A1* 2/2012 Haneda ................... B60R 19/18
293/102
2013/0328334 A1 12/2013 Hoiss et al.
(Continued)

FOREIGN PATENT DOCUMENTS

CN         101559786 A       10/2009
DE    10 2011 004 105 A1     8/2012
(Continued)

OTHER PUBLICATIONS bolt defined with bing dictionary, http://www.bing.com/search?q=define%3A+bolt&src=1E-SearchBox&FORM=IESR02 accessed Mar. 15, 2017.*
(Continued)

*Primary Examiner* — Hilary L Gutman
(74) *Attorney, Agent, or Firm* — thyssenkrupp North America, Inc.

(57) ABSTRACT

A vehicle body may include a crossmember and a longitudinal member. The vehicle body helps ensure improved load absorption in collision events with small overlap between the crossmember and another vehicle or object. The deformation capabilities of the vehicle body in collision events involving a full surface area of the crossmember are not substantially impaired. Form-fitting members that comprise connection partners may be provided for the longitudinal member, wherein the form-fitting members ensure that a
(Continued)

load path of collision energy is introduced into the longitudinal member selectively in the event of a collision with small overlap. A form-fitting member may form a form-fitting connection in a direction of the longitudinal member in the event of a collision.

13 Claims, 1 Drawing Sheet

(51) Int. Cl.
  *B60R 19/16* (2006.01)
  *B60R 19/34* (2006.01)
(58) Field of Classification Search
  USPC ....................................................... 296/187.1
  See application file for complete search history.

(56) References Cited

U.S. PATENT DOCUMENTS

2014/0008936 A1    1/2014  Kim et al.
2015/0061307 A1*   3/2015  Nakanishi ................ F16F 7/12
                                                 293/133

FOREIGN PATENT DOCUMENTS

| DE | 102012005218 A1 | 9/2013 |
| DE | 102012113106 A1 | 1/2014 |
| DE | 102012013278 A1 | 4/2014 |
| JP | 2004066932 A | 3/2004 |
| JP | 2008213739 A | 9/2008 |
| JP | 2012228907 A | 11/2012 |
| WO | 2013172132 A1 | 11/2013 |
| WO | 2014088045 A1 | 6/2014 |
| WO | 2015019167 A1 | 2/2015 |

OTHER PUBLICATIONS

International Search Report for PCT/EP2014/003092 dated Apr. 24, 2015 (dated May 7, 2015).
English Language Abstract for JP2004066932.
English language Abstract for DE 102012013278 A1 listed above.
English language Abstract for DE 102012005218 A1 listed above.
English language Abstract for CN 101559786 A listed above.

* cited by examiner

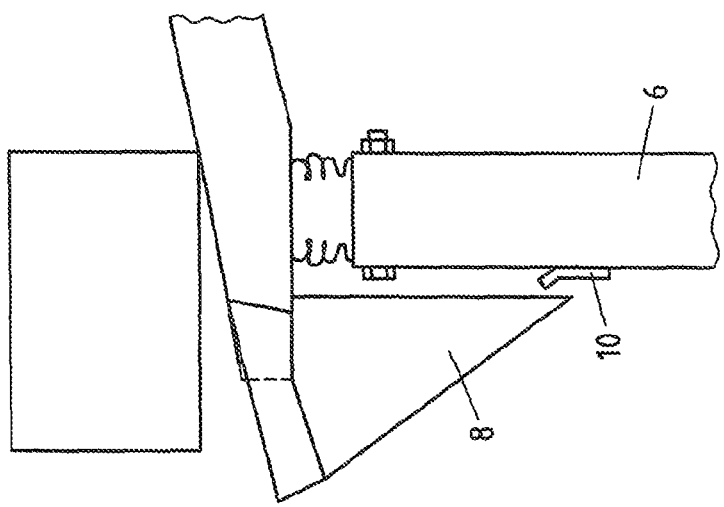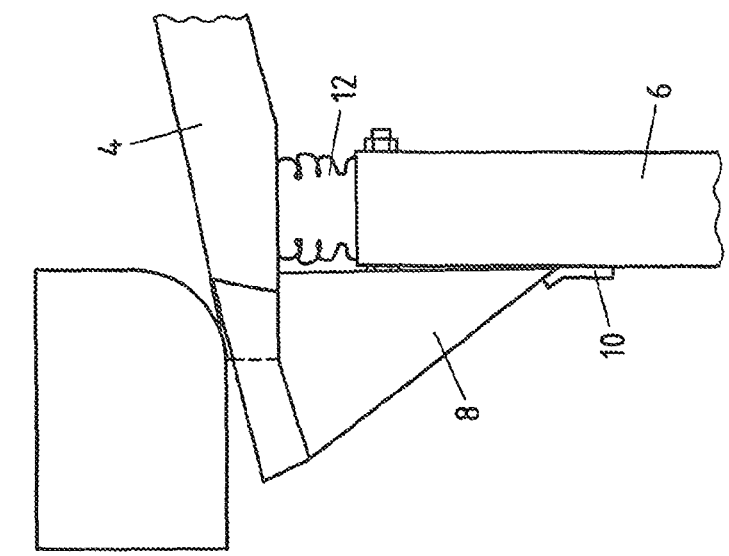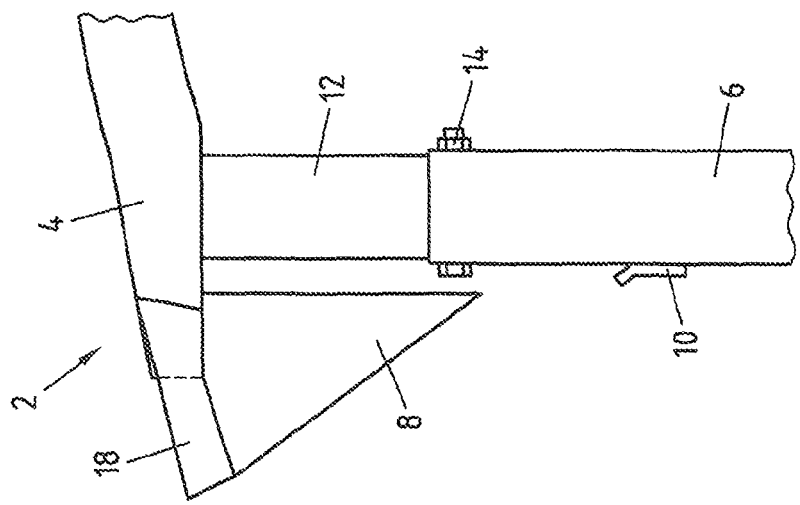

VEHICLE BODY COMPRISING AN INTERCEPTION DEVICE FOR FRONTAL COLLISIONS WITH A SLIGHT OVERLAP

CROSS REFERENCE TO RELATED APPLICATIONS

This application is a U.S. National Stage Entry of International Patent Application Serial Number PCT/EP2014/003092, filed Nov. 19, 2014, which claims priority to German Patent Application No. DE 102013019522.5 filed Nov. 22, 2013, the entire contents of both of which are incorporated herein by reference.

FIELD

The present disclosure relates to vehicle bodies and, more particularly, to vehicle bodies with improved load absorption capabilities in the event of collisions.

BACKGROUND

Since most rear-end collisions of passenger vehicles happen at speeds of below 20 km/h, crash repair tests have been developed in the insurance sector with the aim of reducing damage in the case of typical rear-end collisions. By means of these tests, car insurances categorize passenger vehicles into type classes using the "AZT test". Front end accidents of motor vehicles with a small lateral overlap are frequently associated with a greater risk of injury to the vehicle occupants than front end collisions over the full surface area. This is because, in the case of collisions with a small overlap, only the region next to the longitudinal members of the vehicle body is deformed, and therefore the longitudinal members, which are arranged next to the central longitudinal axis of the motor vehicle, can only inadequately support the load absorption, if at all. In these cases, the absorption of the collision energy leads to a high degree of deformation of the passenger cell, as a result of which there is an increased risk of injury to the vehicle occupants. Accordingly, in the design in particular of the front vehicle body, there is a need for improvement in respect of the load absorption in the event of front end collisions with a small lateral overlap.

In order to improve the energy absorption in the event of collisions with a small overlap, document JP 2004066932 A proposes expanding the longitudinal member laterally, wherein the lateral extension is also connected to the front crossmember. By this means, improved load absorption can be performed by means of the longitudinal member.

Starting from the above-described prior art, the invention is based on the object of specifying a vehicle body which ensures an improved load absorption in the event of collisions with a small overlap, wherein the deformation capability of the body is not substantially impaired in the event of collisions over a full surface area.

According to the invention, this object is achieved by a vehicle body mentioned at the beginning in that means for absorbing collision energy are provided for the at least one longitudinal member, said means ensuring that the load path is introduced into the at least one longitudinal member selectively in the event of a collision with a small overlap, wherein form-fitting means which form a form-fitting connection in the direction of the longitudinal member in the event of a collision are provided.

It has been recognized that the load absorption can be selectively increased in the event of collisions with a small overlap, and therefore the means according to the invention do not negatively influence the absorption of the collision energy in the event of collisions with full overlap of the at least one longitudinal member, in particular in the case of rear-end collisions of below 20 km/h. Owing to the fact that the improved load absorption takes place selectively, in the event of collisions with a small overlap, an increased load absorption can take place without putting the vehicle occupants at risk because of an excessive rigidity of the vehicle body in the region of the impact in the event of front end collisions in which the at least one longitudinal member already brings about an increased load absorption. In the event of collisions with a small lateral overlap, a reduction in the deformation of the passenger cell can be achieved by the means according to the invention, and therefore, in consequence, the protection of the vehicle occupants is increased. By means of the provision of form-fitting means which, in the event of a collision with a small overlap, form a form-fitting connection in the direction of the longitudinal member, the formation of the form-fitting connection is brought about by a deformation, in particular by the buckling of the crossmember in the region next to the longitudinal member and/or by deformation of the at least one longitudinal member. As a result, the deformation of the passenger cell can thus be further reduced and the protection of the vehicle occupants further increased in the event of collisions with a small overlap.

The form-fitting means may either be arranged on the at least one longitudinal member, but may also be at least partially arranged on the crossmember.

The crossmember provided according to the invention can be designed, for example, as a front or rear bumper. It is likewise conceivable for a vehicle body to have an arrangement according to the invention both in the front and in the rear region of the body.

The form-fitting means preferably have at least two connection partners.

According to a preferred refinement of the vehicle body according to the invention, at least one connection partner of the form-fitting means is designed as a wedge-shaped component. The wedge-shaped component may be arranged, for example, on the crossmember, but it may also be fastened to the at least one longitudinal member. The wedge-shaped component may be designed, for example, as a metal sheet or as a hollow profile. In addition to a design as a wedge-shaped component, it is likewise conceivable for a connection partner of the form-fitting means to be designed, for example, as a hollow profile with a polygonal, in particular rectangular, cross section.

Furthermore, the form-fitting means preferably have means for the form-fitting accommodation of the, for example, wedge-shaped component as the second connection partner. According to a particularly preferred embodiment, at least one connection partner of the form-fitting means is designed as a bolt-shaped component. In the event of a collision, the first connection partner, in particular the wedge-shaped component, can then be accommodated in a form-fitting manner by the bolt-shaped component. It is likewise conceivable for the form-fitting means to have different means as connection partners for accommodating the first connection partner, in particular the wedge-shaped component. For example, a recess or projection can be provided on the longitudinal member, which recess or projection is suitable for accommodating the wedge-shaped or differently designed first connection partner.

Alternatively or additionally, a tab-shaped component can be provided which is connected to the at least one longitudinal member and is suitable for accommodating the first connection partner. Particularly preferably, both a tab-shaped component and a recess or a projection can be arranged on the longitudinal member. It is accordingly also conceivable for the form-fitting means to have three connection partners.

The crossmember preferably has at least in regions an angle of smaller than 90° with respect to the longitudinal member. If said angled region is arranged on the outer edge of the crossmember, the load path can be particularly effectively introduced into the at least one longitudinal member in the event of a collision with a small overlap since the form-fitting means are moved in an intensified manner in the direction of the longitudinal member in the event of a collision.

The crossmember can optionally have a reinforcing plate for accommodating the form-fitting means, said reinforcing plate being arranged, for example, at an angle of smaller than 90° with respect to the at least one longitudinal member.

It is furthermore advantageous if the at least one longitudinal member has, in the connection region to the crossmember, a crashbox which can absorb collision energy by means of deformation in the event of a collision. The crashbox is connected to the at least one longitudinal member preferably by means of an integrally bonded or non-positive connection, particularly preferably by means of a screw connection.

According to a further advantageous refinement of the vehicle body according to the invention, the form-fitting means are connected to the crossmember and/or to the at least one longitudinal member in an integrally bonded manner, preferably by means of a welded, brazed or adhesive connection, and/or in a non-positive manner, preferably by means of a screw connection. In addition, it is conceivable for the form-fitting means to be at least partially integrally formed together with the at least one longitudinal member or the crossmember.

In a further advantageous refinement, at least one longitudinal member and/or the crossmember is composed of steel, preferably of a multiphase steel or an ultrahigh strength hot-forming steel. This is because the corresponding longitudinal member and/or crossmember then has particularly high strength, wherein a weight optimization of the longitudinal member and/or of the crossmember can be achieved at the same time. At least one form-fitting means is likewise advantageously composed of steel, preferably of a multiphase steel or an ultrahigh strength hot-forming steel.

BRIEF DESCRIPTION OF THE FIGURES

FIG. 1 is a schematic view of an example vehicle body prior to a collision event.

FIG. 2 is a schematic view of an example vehicle body in an event of a collision with a small overlap.

FIG. 3 is a schematic view of an example vehicle body in an event of a collision with full overlap of an example longitudinal member.

FIG. 4 is a schematic view of an example form-fitting means for absorbing collision energy in an event of a collision with a small overlap.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

FIG. 1 shows a schematic view of a first exemplary embodiment of a vehicle body 2 according to the invention. The vehicle body according to the invention has a crossmember 4 in the form of a bumper, and a longitudinal member 6. In addition, means 8, 10 for absorbing collision energy are arranged on the crossmember 4 and on the longitudinal member 6, said means ensuring that the load path is introduced into the one longitudinal member 6 selectively in the event of a collision with a small overlap.

In detail, the vehicle body 2 has a wedge-shaped component 8 which is arranged on the crossmember 4 and has a bolt-shaped component 10 which is arranged on the longitudinal member 6. The wedge-shaped component 8 is preferably designed as a metal sheet and is preferably composed of a multiphase or high-strength hot-forming steel. The bolt-shaped component 10 is in the shape of an angle. Angles between 90° and 170° are particularly suitable. Other already described designs of the connection partners of the form-fitting means are also suitable for increasing the load absorption in the event of collisions with a small overlap. In the exemplary embodiment illustrated, the form-fitting means 8, 10 are connected to the crossmember 4 and/or to the longitudinal member 6 via a welded connection. In addition, the wedge-shaped component 8 is at a distance which is larger than the cross section of the bolt-shaped component 10 from the longitudinal member 6, and therefore it can be ensured that, according to the invention, in the event of a collision with full overlap, for example in the event of a rear-end collision of the longitudinal member 6, an increased introduction of the load path into the longitudinal member does not take place.

The exemplary embodiment shown in FIG. 1 shows a vehicle body according to the invention in a starting position, i.e. not in the event of a collision. The longitudinal member 6 is connected to the crossmember 4 via a crashbox 12. The crashbox is fastened to the longitudinal member by means of a screw connection 14.

The crossmember 4 is connected to a wedge-shaped component 8. The endpiece of the crossmember 4 has an angle which is smaller than 90° with respect to the longitudinal member 6. Consequently, in the event of a collision with a small overlap, a movement of the wedge-shaped component 8 in the direction of the longitudinal member 6 is initiated.

FIG. 2 illustrates, in a schematic view, the first exemplary embodiment of the vehicle body according to the invention in the event of a collision with a small overlap, wherein the same reference signs refer to the same components of the vehicle body according to the invention. The collision merely involves the region of the body next to the longitudinal member 6. Depending on the severity of the collision, the crashbox 12 of the longitudinal member 6 and/or the crossmember 4 are/is deformed. FIG. 2 shows that, by means of the deformation, the wedge-shaped component 8 is moved in the direction of the longitudinal member 6 and enters into a form-fitting connection with the bolt-shaped component 10.

FIG. 3 then shows a schematic view of the first exemplary embodiment of a vehicle body according to the invention in the event of a collision with full overlap, in particular in the event of a rear-end collision under 20 km/h of the longitudinal member 6, wherein the same reference signs refer to the same components. The illustration shows that at least the crashbox 12 of the longitudinal member 6 is deformed, but the wedge-shaped component 8 is not moved in the direction of the longitudinal member 6. Consequently, a form-fitting connection is not formed between the wedge-shaped component 8 and the bolt-shaped component 10. By means of the arrangement according to the invention for the selective introduction of the load path into the longitudinal member, specifically only in the event of a collision with a small overlap, it can be ensured that if the longitudinal member is fully involved in the collision, deformation of the passenger cell can be further reduced.

FIG. 4 shows a schematic view of a second exemplary embodiment of a form-fitting means for absorbing collision energy in the event of a collision with a small overlap. A bolt-shaped component shown in FIGS. 1 to 3 can likewise have the shape, which is shown in FIG. 4, of a component 20 with a channel-shaped depression.

What is claimed is:

1. A vehicle body comprising:
a crossmember configured as a front or rear bumper of a vehicle, the crossmember extending generally laterally with respect to the vehicle;
a longitudinal member positioned generally longitudinally with respect to the vehicle;
a first connection partner extending generally laterally from the crossmember, wherein the first connection partner is positioned laterally outwards of the longitudinal member with respect to the vehicle, wherein the first connection partner is wedge-shaped; and
a second connection partner disposed along or integrated into the longitudinal member, wherein the second connection partner is bolt-shaped and is spaced apart from the first connection partner,
wherein in a crash event involving only a region of the crossmember that is laterally outwards of the longitudinal member and/or the first connection partner, the crossmember and/or the first connection partner are deformed so that the first connection partner engages with the second connection partner in a form-fit manner thereby transferring energy to the longitudinal member so that the longitudinal member absorbs energy from the crash event,
wherein at least a portion of the second connection partner protrudes from the longitudinal member and is angled directly towards the first connection partner such that an acute angle is formed between the at least the portion of the second connection partner and the longitudinal member.

2. The vehicle body of claim 1 wherein the first connection partner does not engage the second connection partner in a crash event involving a region of the crossmember that is longitudinally aligned with the longitudinal member.

3. The vehicle body of claim 1 wherein a region of the crossmember towards an outer edge of the crossmember is oriented at an angle of less than 90 degrees with respect to the longitudinal member.

4. The vehicle body of claim 1 wherein the bolt-shaped second connection partner extends from the longitudinal member at an angle of between 90 to 170 degrees.

5. The vehicle body of claim 1 wherein the first and second connection partners, the crossmember, and the longitudinal member are comprised of a multiphase steel or a high-strength hot-forming steel.

6. The vehicle body of claim 1 wherein a distance between the first connection partner and the longitudinal member is greater than a cross section of the bolt-shaped second connection partner.

7. The vehicle body of claim 1 wherein a load path is not introduced into the longitudinal member in an event of a collision under 20 km/h with full overlap.

8. The vehicle body of claim 1 wherein the first connection partner is connected to the crossmember in at least one of an integrally bonded manner or a non-positive manner, wherein the second connection partner is connected to the longitudinal member in at least one of an integrally bonded manner or a non-positive manner.

9. The vehicle body of claim 8 wherein the integrally bonded manner comprises a welded connection, a brazed connection, or an adhesive connection, wherein the non-positive manner comprises a screw connection.

10. The vehicle body of claim 1 wherein at least one of the longitudinal member or the crossmember is comprised of a multiphase steel or a high-strength hot-forming steel.

11. The vehicle body of claim 1 wherein at least one of the first connection partner or the second connection partner is comprised of a multiphase steel or a high-strength hot-forming steel.

12. The vehicle body of claim 1 further comprising a crashbox disposed between the crossmember and the longitudinal member, wherein the crashbox absorbs energy from the crash event.

13. The vehicle body of claim 1 wherein in a crash event involving a majority of a total lateral width of the crossmember, the first connection partner does not engage with the second connection partner.

* * * * *